United States Patent

Pecharsky et al.

[11] Patent Number: 5,887,449
[45] Date of Patent: Mar. 30, 1999

[54] DUAL STAGE ACTIVE MAGNETIC REGENERATOR AND METHOD

[75] Inventors: Vitalij K. Pecharsky; Karl A. Gschneidner, Jr., both of Ames, Iowa

[73] Assignee: Iowa State University Research Foundation, Inc., Ames, Iowa

[21] Appl. No.: 881,836

[22] Filed: Jun. 25, 1997

Related U.S. Application Data

[60] Provisional application No. 60/021,217, Jul. 3, 1996.

[51] Int. Cl.$^6$ .................................................. F25B 21/00
[52] U.S. Cl. ..................................... 62/3.1; 62/6; 62/51.1
[58] Field of Search .................................. 62/3.1, 6, 51.1

[56] References Cited

U.S. PATENT DOCUMENTS

| | | | |
|---|---|---|---|
| 4,107,935 | 8/1978 | Steyert | 62/3 |
| 4,829,770 | 5/1989 | Hashimoto | 62/3.1 |
| 4,849,017 | 7/1989 | Sahashi et al. | 75/245 |
| 5,213,630 | 5/1993 | Hashimoto | 148/301 |
| 5,249,424 | 10/1993 | DeGregoria et al. | 62/3.1 |
| 5,435,137 | 7/1995 | Gschneidner et al. | 62/3.1 |
| 5,447,034 | 9/1995 | Kuriyama et al. | 62/3.1 |

OTHER PUBLICATIONS

"Materials for Regenerative Magnetic Cooling Spanning 20K to 80K"; Adv. Cryogenic Eng. 37, 1993, pp. 883–890; Zimm, Ludeman, Severson, Henning.

"Heat Capacity in Superconducting and Normal–State $LaS_x$ (1.333<x<1.500) Compounds"; Phys. Review B, vol. 25, No. 7, Apr. 1, 1982, pp. 4604–4617; Ikeda, Gschneidner, Jr., Beaudry, Atzmony.

"Comptes Rendus Herbdomadaires Des Seances" De L'academie Des Sciences, 247, pp. 1836–1838 (1958).

"Thermodynamic Analysis of Magnetically Active Regenerator From 30 to 70K with a Brayton–like Cycle"; Cryogenics, 1990, vol. 30, Oct. pp. 840–845; Matsumoto, Hashimoto.

"An Ericsson Magnetic Refrigerator For Low Temperature"; Adv. in Cryo. Eng., vol. 33, pp. 743–450; Matsumoto, Ito, Hashimoto.

"Investigations on the Possibility of the $RAl_2$ System as a Refrigerant in an Ericsson Type Magnetic Refrigerator"; pp. 279–286; Hashimoto, et al.

"Binary Alloy Phase Diagrams", 2nd Edition, vol. 1, (1990), pp. 144–145.

"Investigation of the Magnetic Refrigerant for the Ericsson Magnetic Refrigerator"; Jap. J. Appl. Phy., vol. 26 (1987), pp. 1673–1674; Hashimoto, et al.

"New Application of Complex Magnetic Materials to the Magnetic Refrigerant in an Ericsson Magnetic Refrigerator"; J. Appl. Phys. 62(9), Nov. 1, 1987, pp. 3873–3878; Hashimoto, et al.

"Magnetic Properties of (rare earth) $Al_2$ Intermetallic Compounds"; Advances in Physics, 1990, vol. 39, No. 4, pp. 363–370, 378–386; Purwins and Leson.

"Low Temperature Heat Capacities of Laves Phase Lanthanide–Aluminum Compounds"; J. Phys. Chem. Solids, vol. 32, pp. 1853–1866; Deenadas, Thompson, Craig and Wallace.

(List continued on next page.)

Primary Examiner—Ronald Capossela
Attorney, Agent, or Firm—Edward J. Timmer

[57] ABSTRACT

A dual stage active magnetic regenerator refrigerator as well as method using the Joule-Brayton thermodynamic cycle includes a high temperature stage refrigerant comprising $DyAl_2$ or $(Dy_{1-x}Er_x)Al_2$ where x is selected to be greater than 0 and less than about 0.3 in combination with a low temperature stage comprising $(Dy_{1-x}Er_x)Al_2$ where x is selected to be greater than about 0.5 and less than 1 to provide significantly improved refrigeration efficiency in the liquefaction of gaseous hydrogen.

16 Claims, 15 Drawing Sheets

OTHER PUBLICATIONS

"Influence of Crystal Field Interaction on the Thermal Behavior of $ErAl_2$"; Crystal Field Effects in Metal and Alloys, 1977, pp. 143–147; Inoue, Sankar, Craig, Wallage, Gschneidner.

"New Type of Magnetocaloric Effect: Implications on Low–Temperature Magnetic Refrigeration Using an Ericsson Cycle"; Appl. Phys. Lett. 64(20), May 16, 1994, pp. 2739–2741.

"The $(Dy_{1-x}Er_x) Al_2$ Alloys as Active Magnetic Regenerators for Magnetic Refrigeration"; Presented at Cryogenic Engineering Conference, Jul. 17–21, 1995, Columbus, OH. 8 pages.

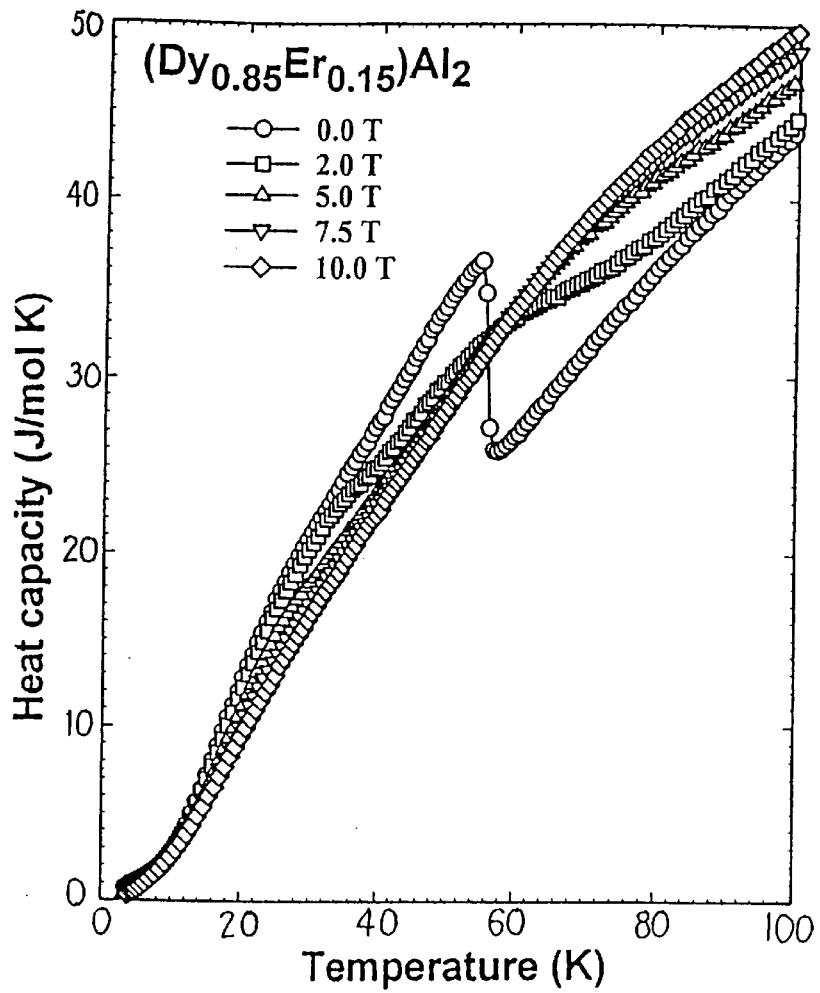
*Fig.4*
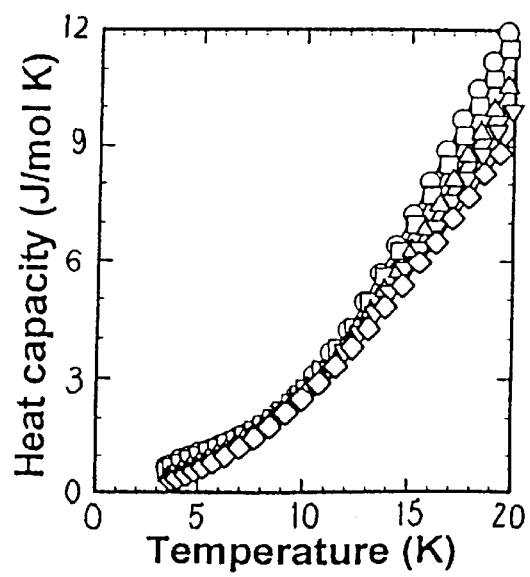
*Fig.4*A

DUAL STAGE ACTIVE MAGNETIC REGENERATOR AND METHOD

CONTRACTURAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

This application claims the benefits of U.S. Provisional Application Ser. No. 60/021,217 filed Jul. 3, 1996.

FIELD OF THE INVENTION

The present invention relates to magnetic refrigeration and, more particularly, to an active two stage magnetic regenerator and method useful, although not limited to, for the liquefaction of gaseous hydrogen.

BACKGROUND OF THE INVENTION

Magnetic refrigeration is being considered as an alternative technique to gas compressor technology for cooling and heating based on engineering and economic considerations that indicate that magnetic regenerator refrigerators, in principle, using currently known and available magnetic materials are more efficient than gas cycle refrigerators and thus can yield savings in the cost of operation and conservation of energy.

In magnetic regenerator refrigeration for the liquefaction of hydrogen gas, a demonstration magnetic regenerator is designed to operate over a temperature region from about 20 K to about 90 K with heat rejection typically into liquid nitrogen heat exchanger. An active magnetic refrigerant proposed for the demonstration regenerator for the low temperature stage (operating at approximately 20 K to 55 K) to achieve liquefaction comprises a GdPd alloy while a higher temperature stage (operating at approximately 45 K to 90 K) comprises $GdNi_2$. The low temperature stage GdPd magnetic refrigerant is disadvantageous from a cost standpoint in that 50 atomic % of the alloy comprises expensive Pd metal. Moreover, although the GdPd alloy exhibits useful magnetic entropy, there are several other heavy rare earth lanthanides (e.g. Tb, Dy, Ho, and Er) that exhibit magnetic entropy values approximately 35% larger than that of Gd and thus theoretically offer improved properties for magnetic refrigeration, provided all of the magnetic entropy is associated with the ferromagnetic ordering process on which magnetic refrigeration is based. Magnetic materials including Tb, Dy, Ho, and Er appear to have been neglected as candidate magnetic refrigerant materials as a result of the belief that an appreciable fraction of the magnetic entropy of these materials is associated with crystalline electric field effects, not ferromagnetic ordering, and thus would be less than the magnetic entropy attributed to ferromagnetic ordering observed in Gd in which there are no crystal field effects. Moreover, materials containing Tb, Dy, Ho, and Er exhibit a disadvantageously lower ferromagnetic ordering temperature than the corresponding Gd materials.

U.S. Pat. No. 4,829,770 describes an attempt to provide a magnetic refrigerant material exhibiting magneto-thermal properties for a magnetic regenerator refrigerator based on the Ericsson thermodynamic cycle. In particular, the patent describes a complex magnetic refrigerant that must include at least three distinct magnetic aluminide compounds in powdered or sintered admixture or in a multi-layered arrangement. The magnetic compounds are selected from aluminides of Gd, Tb, Dy, Ho and Er. The magnetic refrigerant mixture or multi-layer described in the patent is formulated for use specifically in an Ericsson thermodynamic cycle refrigerator and it requires at least three layers of different refrigerant materials.

U.S. Pat. No. 5,435,137 describes a ternary magnetic refrigerant comprising $(Dy_{1-x}Er_x)Al_2$ for a magnetic regenerator refrigerator using the Joule-Brayton thermodynamic cycle spanning a temperature range of about 60 K to about 10 K where the ternary alloy can be used as a sole refrigerant in that range as a result of its magnetocaloric properties.

An object of the present invention is to provide a dual stage magnetic regenerator for a magnetic refrigerator and refrigeration method using the Joule-Brayton thermodynamic cycle and using a combination of active magnetic refrigerant materials that provide significantly improved regenerator efficiency.

SUMMARY OF THE INVENTION

The present invention provides a dual stage active magnetic regenerator as well as method using the Joule-Brayton thermodynamic cycle and having a higher temperature stage including an active magnetic refrigerant comprising $DyAl_2$ and a low temperature stage including an active magnetic refrigerant comprising $(Dy_{1-x}Er_x)Al_2$ where x is selected to be greater than about 0.5 and less than 1 so as to be rich in erbium. An alternative high temperature stage active magnetic refrigerant may comprise $(Dy_{1-x}Er_x)Al_2$ where x is selected to be greater than 0 and less than about 0.3. A preferred low temperaure stage active magnetic refrigerant comprises $(Dy_{1-x}Er_x)Al_2$ where x is selected to be from about 0.6 to about 0.9.

An active magnetic regenerator for a magnetic refrigerator having the combination of the high and low temperature stage active magnetic refrigerants pursuant to the present invention yields significantly improved regenerator efficiency for example in the liquefaction of gaseous hydrogen.

In an exemplary embodiment of the invention for providing liquefaction of hydrogen at approximately 20 K, the active magnetic regenerator refrigerator includes a high temperature stage with an active magnetic refrigerant comprising $DyAl_2$ operating at approximately 85 to 45 K and a low temperature stage comprising $(Dy_{0.4}Er_{0.6})Al_2$ operating at approximately 50 to 15 K.

In another exemplary embodiment of the invention for cooling hydrogen gas to produce hydrogen slush at approximately 15 K, the active magnetic regenerator refrigerator includes a high temperature stage with an active magnetic refrigerant comprising $DyAl_2$ operating at approximately 85 to 45 K and a low temperature stage with an active mangertic refrigerant comprising $(Dy_{0.25}Er_{0.75})Al_2$ operating at approximately 45 to 15 K.

The aforementioned objects and advantages will become more readily apparent form the following detailed description taken with the following drawings.

DESCRIPTION OF THE DRAWINGS

FIGS. 4 and 4A are graphs of heat capacity versus temperature for five magentic fields from approximately 3.5 K to 100 K for the $(Dy_{0.85}Er_{0.15})Al_2$ material.

DETAILED DESCRIPTION OF THE INVENTION

The magnetic regenerator of the invention is useful in a magnetic refrigerator operating on the known Joule-Brayton (also referred to simply as Brayton) thermodynamic cycle. The Joule-Brayton cycle involves an adiabatic compression step/heating step adiabatic expansion step/cooling step regardless of whether refrigeration is via gas working medium or magnetic refrigerant working medium. With respect to the use of a magnetic refrigerant, the refrigeration is effected by cyclic heat dissipation and heat absorption in the course of adiabatic magnetization and adiabatic demagnetization of the magnetic refrigerant via application/discontinuance of external magnetic fields. The Joule-Brayton refrigeration cycle is used and described in the DeGregoria et al. article entitled TEST RESULTS OF AN ACTIVE MAGNETIC REGENERATIVE REFRIGERATOR, Advances in Cryogenic Engineering, Vol. 37, Part B, pages 875–882, 1992, and the DeGregoria article entitled MODELING THE ACTIVE MAGNETIC REGENERATOR, Advances in Cryogenic Engineering, Vol. 37, Part B, pages 867–873, 1992 as well as U.S. Pat. No. 5,435,137, the teachings of which are incorporated herein by reference. The Joule-Brayton refrigeration cycle for liquefaction of hydrogen and/or hydrogen slush typically can be efficiently conducted in the temperature range of about 60 K to 10 K.

Figure 1:
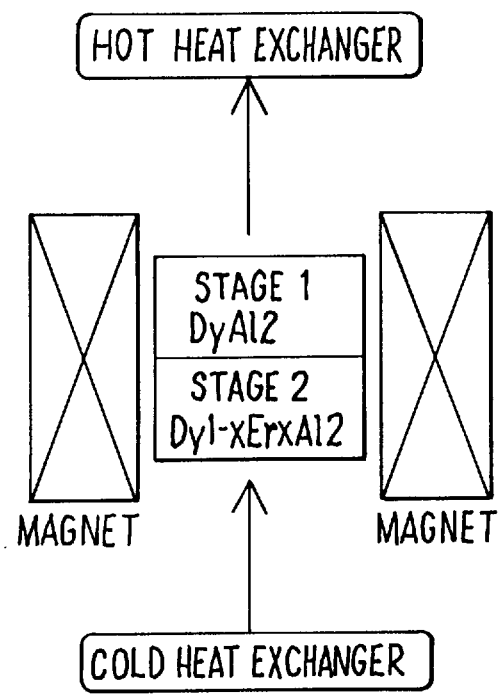
FIG. 1 is a schematic illustration of a dual stage active magnetic regenerator refrigerator having a high temperature stage and low temperature stage using the Joule-Brayton thermodynamic cycle.

The present invention involves a dual stage active magnetic regenerator refrigerator as illustrated schematically in FIG. 1 using the aforementioned Joule-Brayton thermodynamic cycle. The regenerator refrigerator comprises a relative high temperature stage 1 comprising an active magnetic refrigerant comprising $DyAl_2$ and a low temperature stage 2 having an active magnetic refrigerant comprising $(Dy_{1-x}Er_x)Al_2$ where x is selected to be greater than about 0.5 and less than 1. An alternative active magnetic refrigerant for the high temperature stage may comprise $(Dy_{1-x}Er_x)Al_2$ where x is selected to be greater than 0 and less than about 0.3 with a particular value of x selected to provide sufficient cooling power from approximately 85 to 45 K to effectively and efficiently cool hydrogen gas for the lower temperature stage.

A preferred active magnetic refrigerant for the low temperature stage comprises $(Dy_{1-x}Er_x)Al_2$ where x is selected to be about 0.6 to about 0.9. For purposes of illustration only, the high temperature stage and low temperature stage are shown as respective layers 1 and 2 of the aforementioned active magnetic refrigerants. The combination of the high temperature stage and low temperature stage active magnetic refrigerants pursuant to the present invention yields significantly improved regenerator efficiency, for example, in the cooling of gaseous hydrogen, such as in the liquefaction of gaseous hydrogen, as compared to demonstration regenerator refrigerators proposed to-date.

The regenerator typically includes a conventional magnet, such as a superconducting magnet (however for lower liquefaction rates a permanent magnet could be used), for subjecting the active magnetic refrigerants of stage 1 and stage 2 to magnetization/demagnetization cycles. In operation, the two stage active magnetic regenerator warms up upon magnetization to a temperature higher than that of the hot heat exchanger shown and releases heat into the hot heat exchanger. The regenerator cools down upon demagnetization to a temperature lower than that of the cold heat exchanger shown and draws heat from the cold heat exchanger.

For purposes of illustration and not limitiation, the active magnetic refrigerant comprising $DyAl_2$ for the relatively high temperature stage and the active magnetic refrigerant comprising $(Dy_{1-x}Er_x)Al_2$ for the relatively low temperature stage may be made conveniently by melting the elemental components, Dy and Er, together to form a precursor alloy and then by melting the precursor alloy together with Al in proper proportions to form the desired end-use refrigerant materials. For example, Dy and Er metals can be prepared with 99.8 atomic % or better purity in accordance with the Gschneidner et al. article in *Appl. Phys. Lett.*, 64:253 (1994), the teachings of which are incorporated herein by reference to this end. Samples of active magnetic refrigerants for determination of magnetic properties were made by first conventionally arc-melting the aforementioned Dy and Er elemental metals in bulk form in the proper proportions on a water-cooled copper hearth in an argon atmosphere to form a precursor alloy and then conventionally arc-melting the precurosr alloy with Al elemental metal in bulk form having a purity greater than 99.999 atomic % from the commercial supplier on a copper hearth in an argon atmosphere. Commercially available Dy and Er with 99–99.9 wt. % purity and Al with 99–99.9 wt. % purity also can be used in making the $(Dy_{1-x}Er_x)Al_2$ alloys. Since the phases of the $(Dy_{1-x}Er_x)Al_2$ system where x=0 to 1 melt congruently, the melted samples were simply solidified in an argon atmosphere on the copper hearth without a subsequent annealing heat treatment. The binary and ternary alloy samples so produced were found by metallographic and X-ray examination to be essentially single phase (e.g. having the cubic Laves phase structure) with less than 1 volume % of second phase present in the microstructure. The substantially single phase as-cast microstructure of the binary $DyAl_2$ and ternary $(Dy_{1-x}Er_x)Al_2$ materials is advantageous in that the materials can be used as active magnetic refrigerants as described below in the practice of the present invention in the as-cast condition without heat treatment. The binary and ternary active magnetic refrigerant alloys can be formed into particulates for use as an magnetic refrigerant, such as a particulates layer or bed in the Joule-Brayton regenerator refrigerator. For example, the as-cast alloys can be ground or crushed to particulates, for example, 0.1 to 2 millimeters in size, to this end. Alternately, the alloys can be melt atomized to form powder to this same. The alloy particulates can be formed into the high temperature stage layer 1 and low temperature stage layer 2 by packing as a layered bed and keeping the two materials. or layers separated by a fine mesh screen. A magnetic refrigerant particulate bed is known and shown in the aforementioned DeGregoria et al. article incorporated herein by reference.

The heat capacity of the samples of the binary and ternary active magnetic materials was measured from approximately 3.5 to 350 K in magnetic fields of 0. 2.0, 5.0, 7.5, and 10.0 Tesla using an adiabatic heat-pulse calorimeter, described in application Ser. No. 08/753,036 "Calorimetric System", comprising a cryostat having a liquid helium cooled 12 Tesla superconducting magnet [5 centimeter (cm) clear bore, 1 by 1 cm homogenous magnetic field, cylindrical volume] manufactured by Cryogenic Consultants Ltd., London, England, equipped with a room temperature double layered vacuum insulated insert which left approximately 2.5 cm clearance inside the magnet bore space. A calorimeter and low temperature liquid helium pot-holding insert allowed cooling of the calorimeter to approximately 3 K, the separation between the helium pot and the sample holder being adjusted as a small as possible to reach this low temperature. The heat capacity data were collected using automated data acquisition system based on an IBM-compatible Zenith 386/20 desktop computer with National Instruments IEEE-488 GPIB board and high precision electronics manufactured by Keithley Electronics, Cleveland, Ohio, such as as two Keithley model 224 dc current sources, Keithley model 181 nanovoltmeter, Keithley model 196 digital multimeter/scanner and a TRI Research model T-2000 cryocontroller, all devices being compatible with the IEEE-488 board. A high speed vacuum pumping system was used to attain a vacuum of $10^{-7}$ Torr.

A low oxygen pure copper (99.99 weight % Cu) sample holder was used to hold the sample by clamping between a main round copper support plate and a copper screw engaging an opposite side of the sample from the copper plate. Thermal connection between the sample and copper support plate was increased by proivding a 50:50 by volume mixture of Apiezon-N grease and fine 10 micron silver powder placed there between. A CERNOX temperature sensor [calibrated in accordance with International Temperature Scale of 1990 (ITS-1990)] was inserted in the tightly fitted copper clamp located on the opposite side of the aforementioned copper support plate and was held in place using GE-7031 varnish. The calorimeter itself was calibrated using the 1965 Calorimetric Conference copper standard. A thin film strain gage heater CEA-06-062UW-350 from Measurements Group, Inc. was mounted on the same side of the copper support plate as the temperature sensor using a silver epoxy. Cooling of the sample holder and sample was provided by a mechanical heat switch, a short copper wire, connected to and disconnected from an alligator clamp, which was permanently thermally shorted to the low temperature helium pot located above the sample holder. The sample holder was permanently hung by four thin (0.15 millimeter) nylon threads to a massive copper frame with the frame attached to the bottom of a low temperature helium pot. The low temperature helium pot together with the massive copper frame and sample holder form a removable portion of the calorimeter system and fit inside the room temperature vacuum jacketed insert placed in the cryostat. The thermal insulation of the calorimeter with the mechanical heat switch opened was provided by pumping the system down to a vacuum level of approximately $1 \times 10^{-7}$ Torr. The accuracy of the heat capacity measurements was approximately 0.5% over the whole temperature region, as described in Ser. No. 08/753,036 "Calorimetric System" hereby incorporated herein by reference.

The ac and dc magnetic susceptibilities and the BH hysteresis loops (where B is the magnetic induction and H is the magnetic field strength) were measured using a Lake Shore Cryotronics ac susceptometer/dc magnetometer in applied fields up to 5.0 Tesla.

Figure 2:
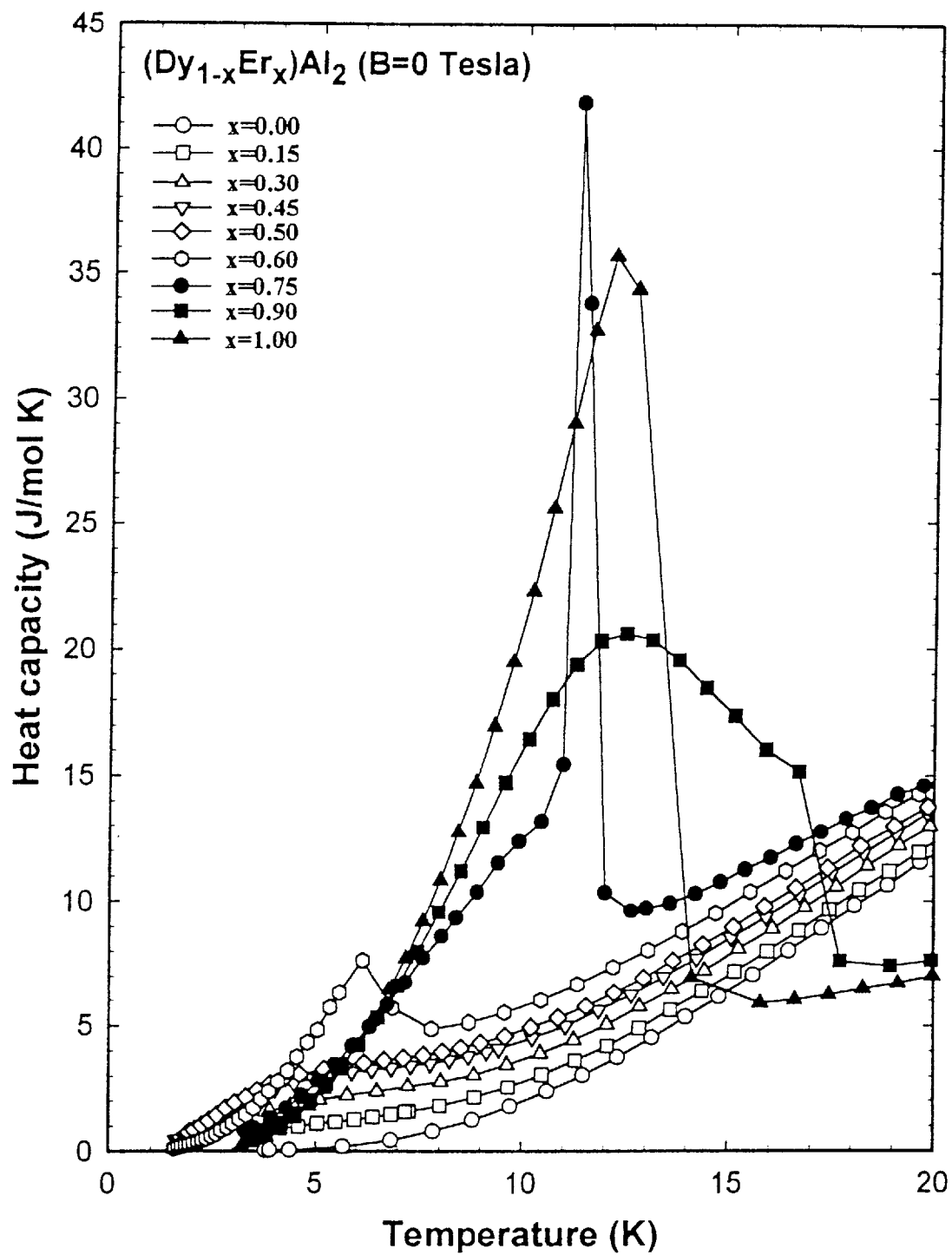
FIG. 2 is a graph of zero field heat capacity versus temperature from approximately 2 K to 20 K for the listed $(Dy_{1-x}Er_x)Al_2$ materials.
Figure 3A:
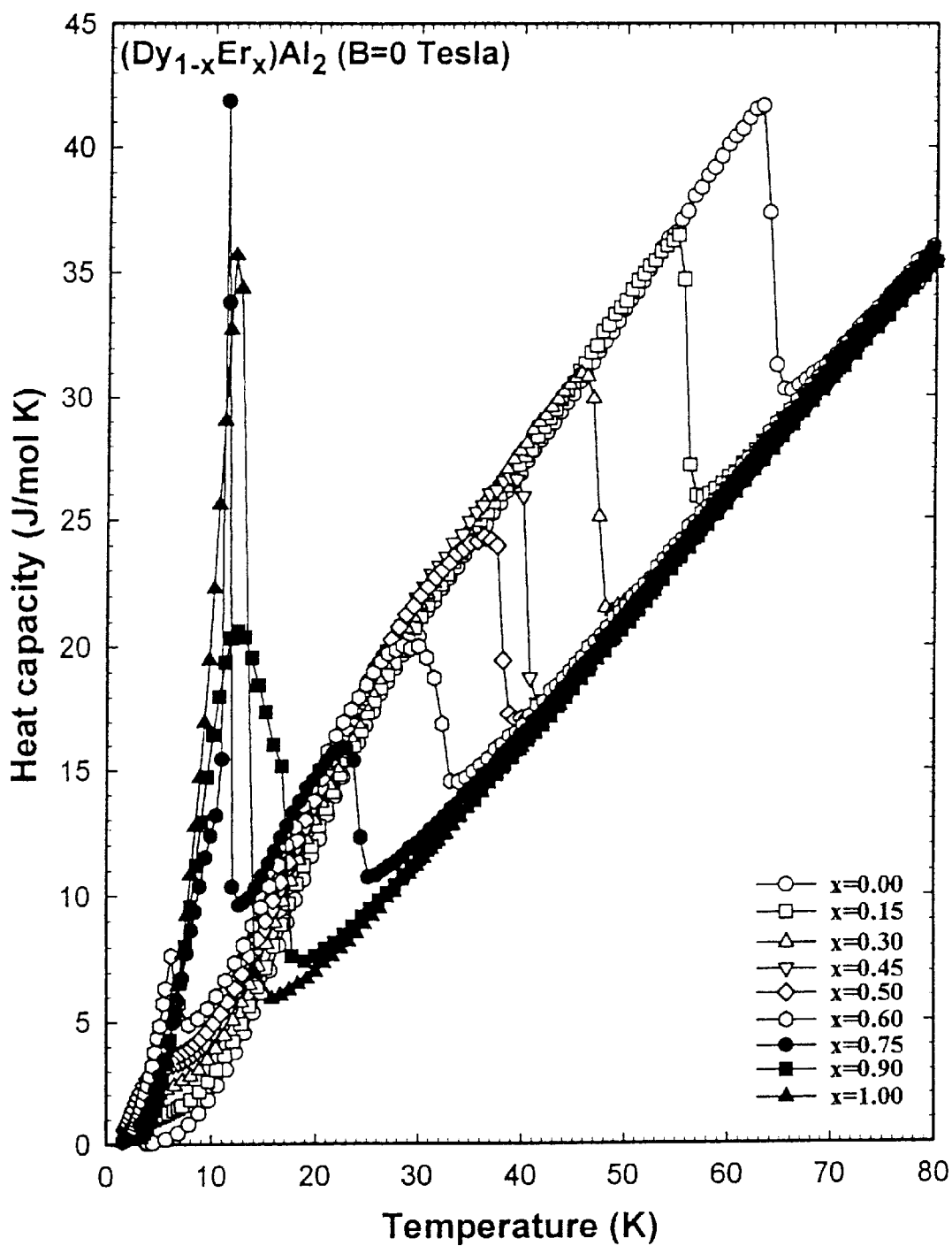
FIG. 3A is a graph of zero field heat capacity versus temperature from approximately 2 K to 80 K for the listed $(Dy_{1-x}Er_x)Al_2$ materials.
Figure 14:
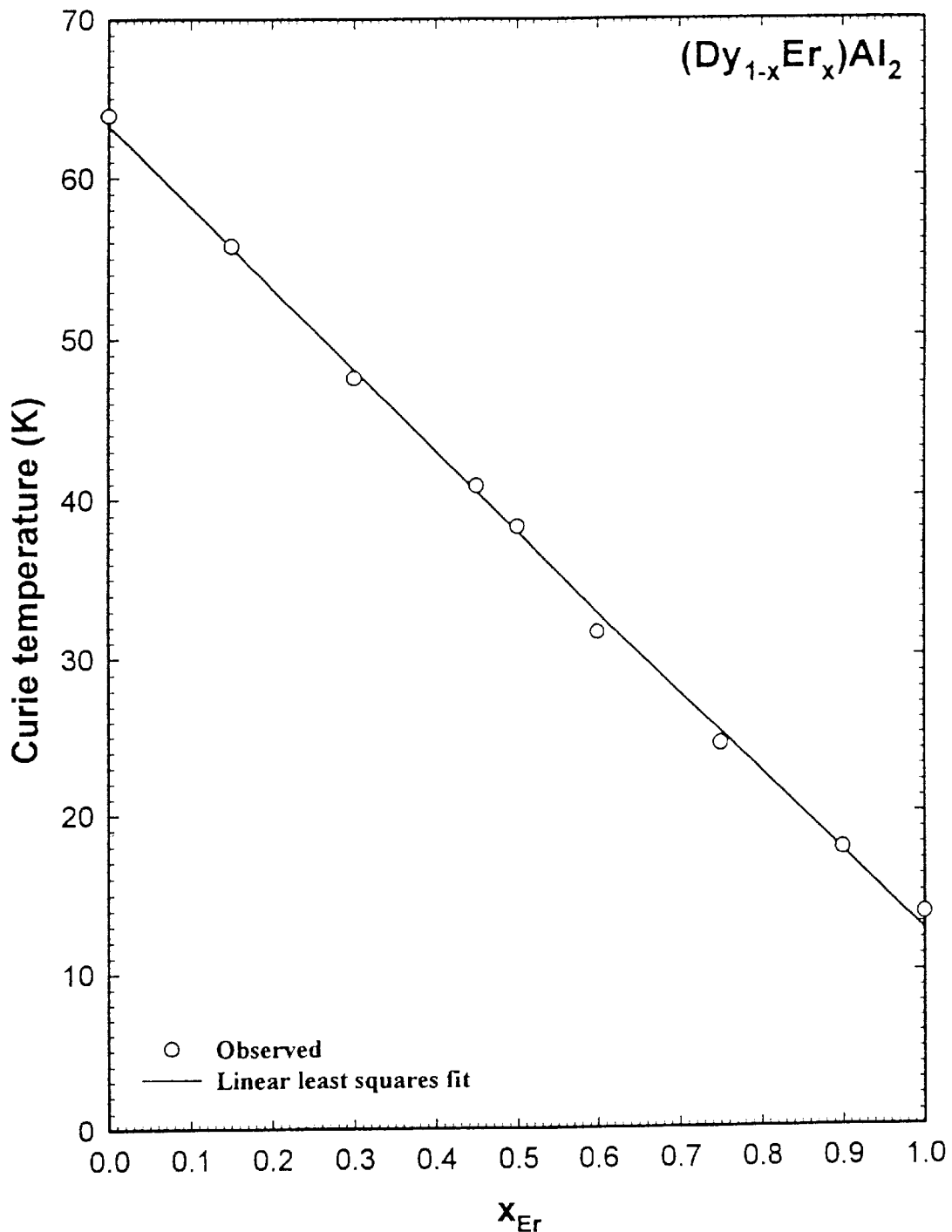
FIG. 14 is a graph of ferromagnetic Curie temperature as a function of erbium content for $(Dy_{1-x}Er_x)Al_2$ materials having specified x values.

FIG. 2 illustrates zero field heat capacity versus temperature from approximately 2 K to 20 K for the $(Dy_{1-x}Er_x)Al_2$ materials with x values specified on the figure. FIG. 3A illustrates zero field heat capacity versus temperature from approximately 2 K to 80 K for the same materials. The heat capacity of the $(Dy_{1-x}Er_x)Al_2$ alloys where x=0.6 to 1.0 exhibit a sharp peak below 14 K with the peak height decreasing with decreasing x value. For higher content Dy alloys (e.g. x=0 to 0.75), the heat capacities exhibit a broad lambda-type ferromagnetic transition with an abrupt drop at $T_c$ (Curie temperature) as apparent (the variation of Curie temperature with Er content is shown in FIG. 14).

Figure 3B:
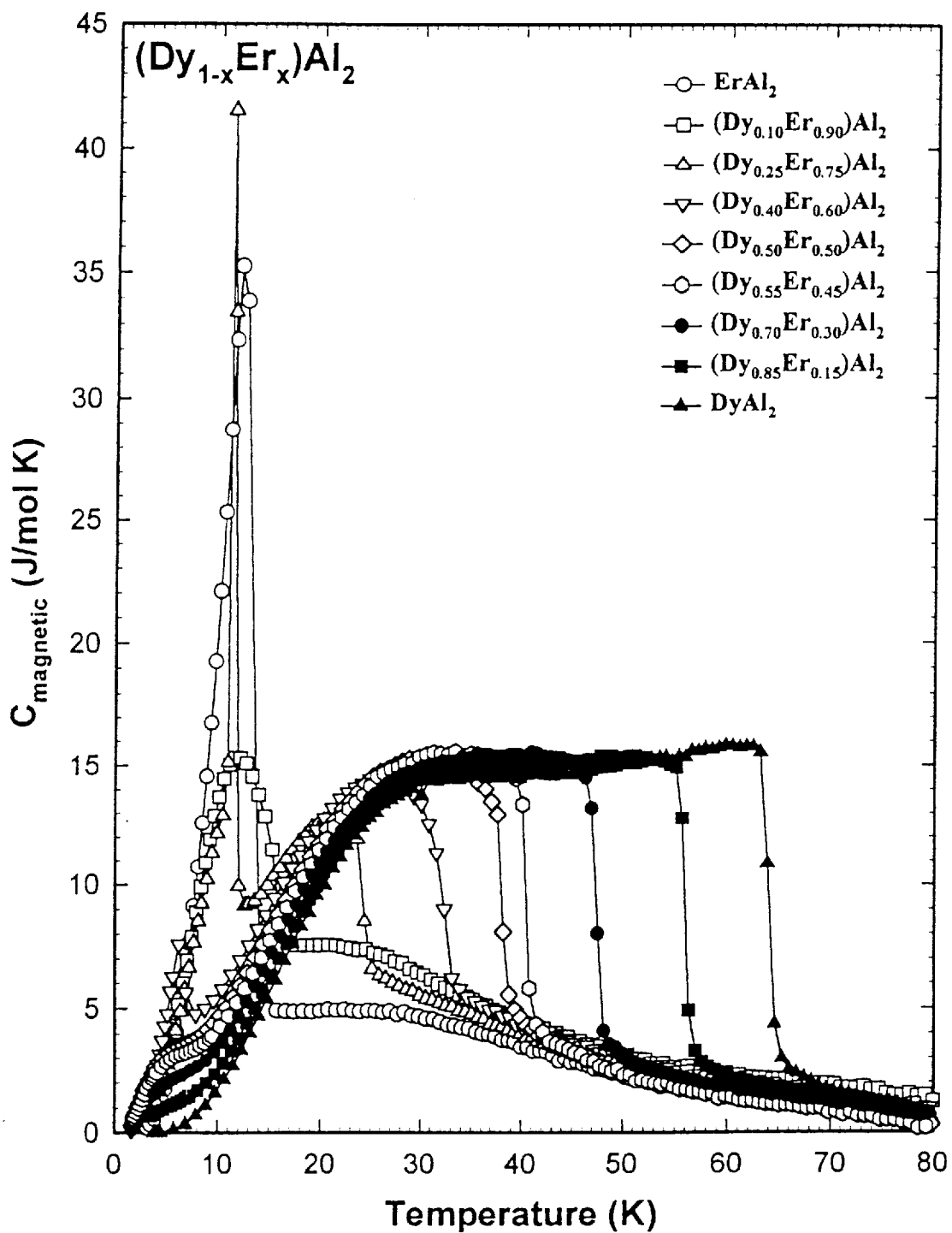
FIG. 3B is a graph of zero field magnetic heat capacity versus temperature from approximately 2 K to 80 K for the listed $(Dy_{1-x}Er_x)Al_2$ materials.

FIG. 3B is a graph of the zero field magnetic heat capacity versus temperature from approximately 3.5 to 80 K for the listed $(Dy_{1-x}Er_x)Al_2$ materials. Basically, these curves show how the magnetic entropy which is ultilized in magnetic refrigeration varies with temperatures.

In order to determine the magnetic contribution to the heat capacity ($C_M$) (FIG. 3B) of the $(Dy_{1-x}Er_x)Al_2$ alloys, the prorated zero-field heat capacities of $LaAl_2$ and $LuAl_2$ (assumes that this corresponds to the lattice and electronic contributions) were subtracted from the total measured heat capacities of the $(Dy_{1-x}Er_x)Al_2$ alloys. The prorated zero-field heat capacities of $LaAl_2$ and $LuAl_2$ are available in *J. Phys. Chem. Solids*, 38:487 (1977)] and *J. Phys. Chem. Solids*, 32:1853 (1971), respectively. The resultant $C_M$ includes both the crystalline electric field (CEF) and magnetic ordering contributions. From a plot of $C_M$ versus T, where T is temperature in K, the magnetic entropy ($S_M$) can be derived by integrating the $C_M/T$ versus T curves as is known. These are tabulated in Table 1 and found to range from 20.6 to 21.8 Joule/mole K, or 89 to 95% of the theoretical entropy, which is larger than that normally observed for magnetic substances. The missing entropy is probably due to magnetic spin fluctuations well above $T_c$ and usually amounts to approximately 15%.

TABLE 1

Magnetic Properties of $(Dy_{1-x}Er_x)Al_2$ Alloys

| Composition | $T_c$ (K.) | | Curie-Weiss Behavior | | | $S_M$ |
|---|---|---|---|---|---|---|
| | $x_{sc}$ | MCE | Effective moment ($\mu_B$) (obs.) | (the-or.) | $\theta_p$ (K.) | (J/mol R) |
| $DyAl_2$ | 63.3 | 63.9 | 10.65(2) | 10.65 | 71.8(9) | 20.6 |
| $(Dy_{0.85}Er_{0.15})Al_2$ | 54.4 | 55.7 | 10.53(2) | 10.50 | 62.8(9) | 21.0 |
| $(Dy_{0.70}Er_{0.30})Al_2$ | 45.5 | 47.5 | 10.29(2) | 10.34 | 54.7(1.4) | 21.3 |
| $(Dy_{0.55}Er_{0.45})Al_2$ | 39.3 | 40.8 | — | — | — | 20.7 |
| $(Dy_{0.50}Er_{0.50})Al_2$ | 37.8 | 38.2 | 10.18(2) | 10.12 | 40.9(9) | 21.0 |
| $(Dy_{0.40}Er_{0.60})Al_2$ | 32.0 | 31.6 | 10.02(1) | 10.02 | 36.3(9) | 21.0 |
| $(Dy_{0.25}Er_{0.75})Al_2$ | 24.0 | 24.4 | 9.91(2) | 9.86 | 31.7(9) | 21.6 |
| $(Dy_{0.10}Er_{0.90})Al_2$ | 16.3 | 17.7 | 9.68(2) | 9.69 | 22.9(1.5) | 21.4 |
| $ErAl_2$ | 13.0 | 13.6 | 9.59(1) | 9.58 | 19.7(8) | 21.8 |

For purposes of further illustration, FIG. 4 shows heat capacity of $(Dy_{0.85}Er_{0.15})Al_2$ from approximately 3.5 to 100 K for five magnetic fields listed on the figure.

The magnetic field dependence of the heat capacity of the $(Dy_{1-x}Er_x)Al_2$ alloys corresponds to that of a ferromagnet; i.e. the magnetic heat capacity is lowered below $T_c$ and raised above $T_c$ relative to that of the zero field heat capacity. In particular, the magnetic entropy is shifted to higher temperatures with increasing magnetic fields.

Figure 5:
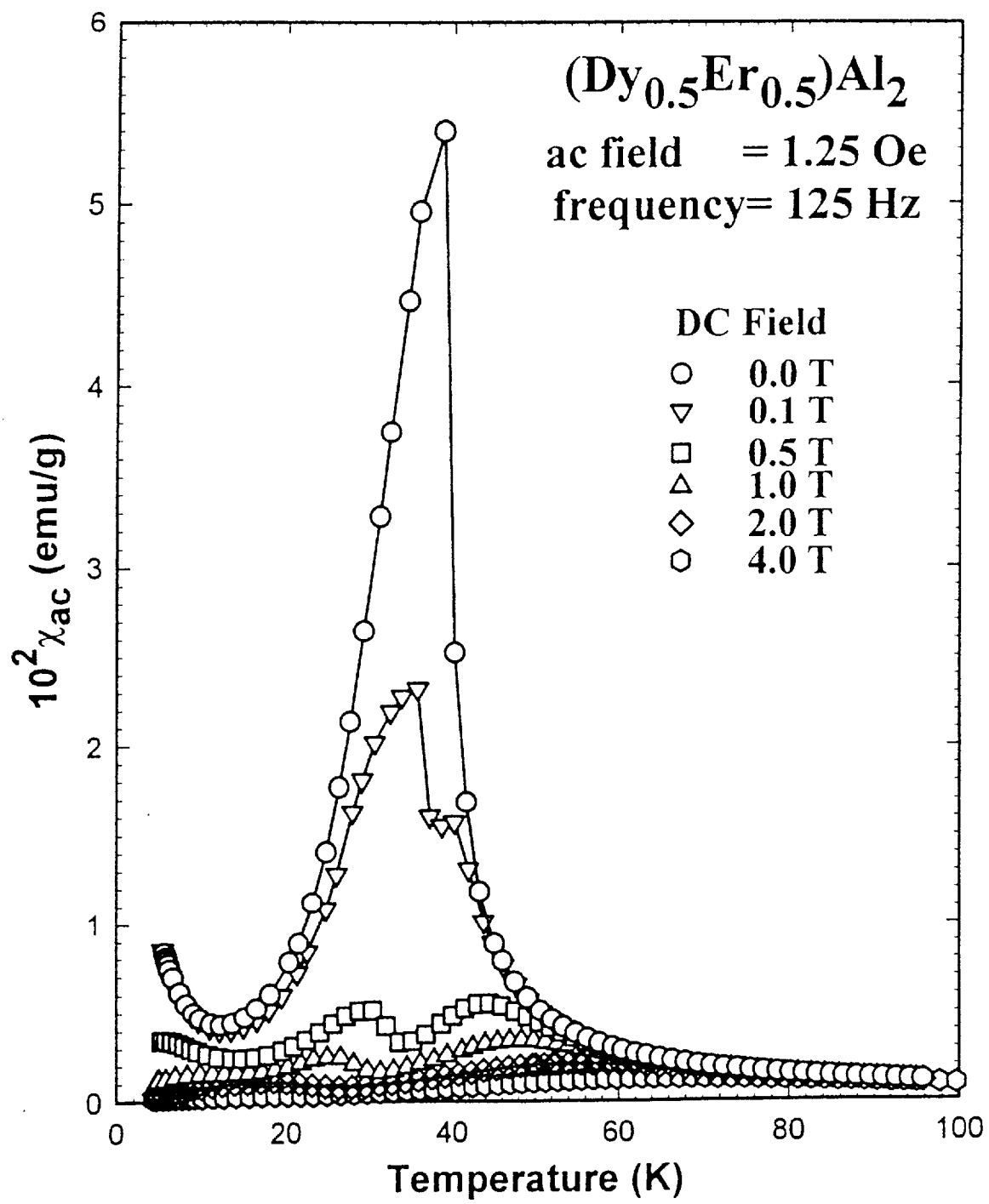
FIG. 5 is a graph of the ac magnetic susceptibility $x_{ac}$ of $(Dy_{0.5}Er_{0.5})Al_2$ material as a function of temperature for several applied magnetic fields.

The ac magnetic susceptibility of the $(Dy_{0.5}Er_{0.5})Al_2$ alloy is shown in FIG. 5. FIG. 5 shows a sharp, nearly symmetrical peak at $T_c$ in a zero bias dc field, which splits into two peaks in an applied field dc field H greater than 0.1 Tesla. At the lowest fields, the low temperature peak is larger than the high temperature peak, but the converse occurs with incresing field. The low temperature peak generally is no longer observable for H greater than 2.5 Tesla. This phenonmena is also observed in pure $ErAl_2$ an is not due to the presence of two different lanthanide atoms in the alloy. Although not wishing to be bound by any theory, it is believed that the phenonmena is due to reorientation of spins from the [100] direction to [111] direction. in the polycrystalline alloys tested such that the alignment increases with increasing field and finally the spins are completely aligned for H greater than 2.5 Tesla.

Figure 6:
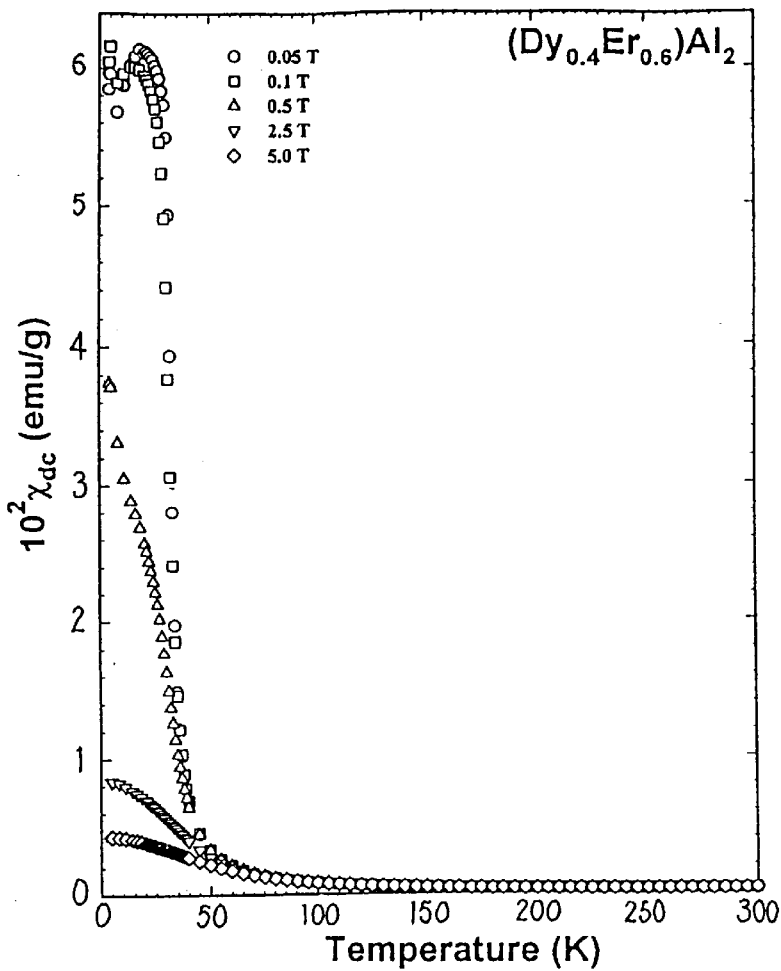
FIGS. 6 and 6A are graphs of the dc magnetic susceptibility $x_{dc}$ of $(Dy_{0.4}Er_{0.6})Al_2$ material as a function of temperature for several applied magnetic fields.
Figure 6A:
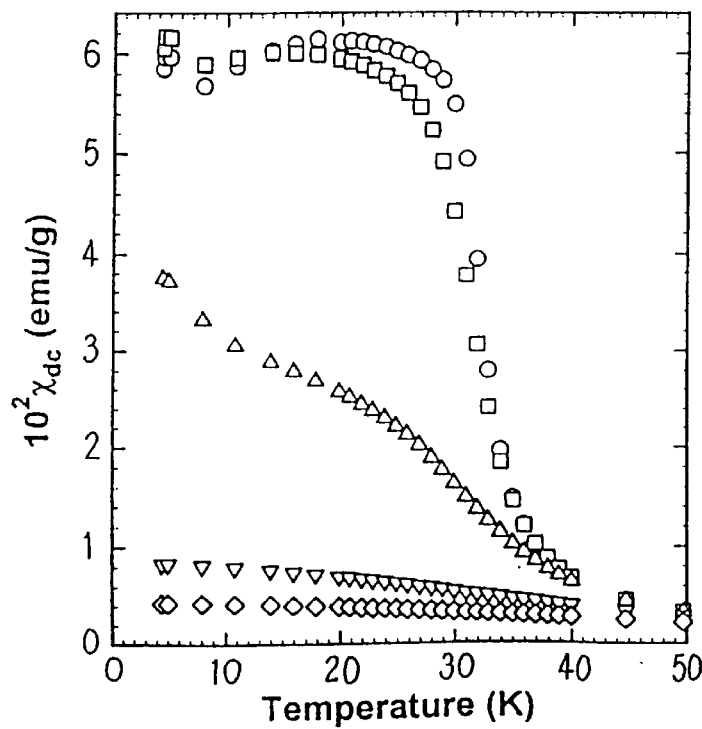

The dc magnetic susceptibility of the $(Dy_{0.4}Er_{0.6})Al_2$ alloy is shown in FIG. 6. FIG. 6 shows a strong magnetic field dependence of the magnetic susceptibility, which is typical of a ferromagnet.

Figure 7:
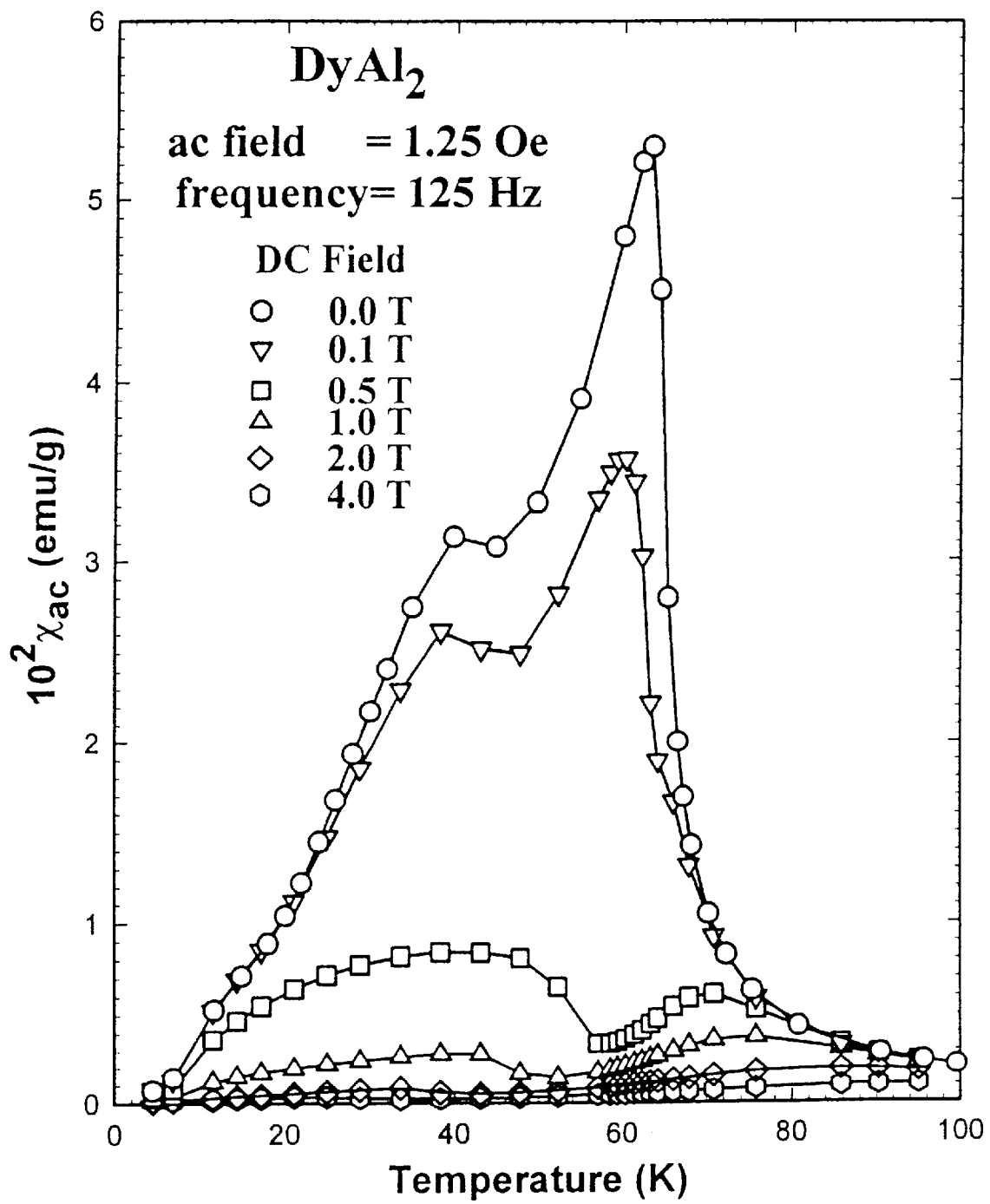
FIG. 7 is a graph of the ac magnetic susceptibility of $DyAl_2$ material as a function of temperature for several applied magnetic fields.

The temperature variation of the ac magnetic susceptibility of $DyAl_2$ material is illustrated in FIG. 7. FIG. 7 shows a double peak in the absence of a dc bias field, while the x=0.15 and 0.30 $(Dy_{1-x}Er_x)Al_2$ alloys exhibit a shoulder feature on the low temperature side of an asymmmetric peak. The upper peak is due to ferromagnetic ordering with an easy axis along the<111> direction, while the lower peak (or shoulder) is due to spin reorientation from the <111> to the <100> directions.

The dc magnetization (M) results are consistent with ferromagnetic ordering. Below the $T_c$ temperature, the M versus H curves show typical saturation behavior, from which magnetocaloric entropy, $dS_M$, can be calculated for comparison below to that obtained from the field dependence of heat capacity. Table 1 above sets forth $T_c$ (Curie temperature) values for the binary and ternary alloys listed as determined from the zero field ac susceptibility results $\chi_{ac}$. The $T_c$ results are in agreement with $T_c$ results determined from magnetocaloric peak values (MCE, Table 1) set forth in Table 2 ($T_{max}$) below and described below. The $T_c$ values are also plotted as a function of $\chi$ in FIG. 14.

Evidence for the spin reorientation transitions were observed in the ac susceptibility versus temperature plots for H less than 0.5 Tesla. Above $T_c$, the ac susceptibility follows the Curie-Weiss law with the measured magnetic moments in agreement with theoretical values, Table 1. The paramagnetic Curie temperature, $\theta p$, determined from a linear least squares fit using the Curie-Weiss law are 4 K to 10 K higher than the observed $T_c$ values.

Figure 8:
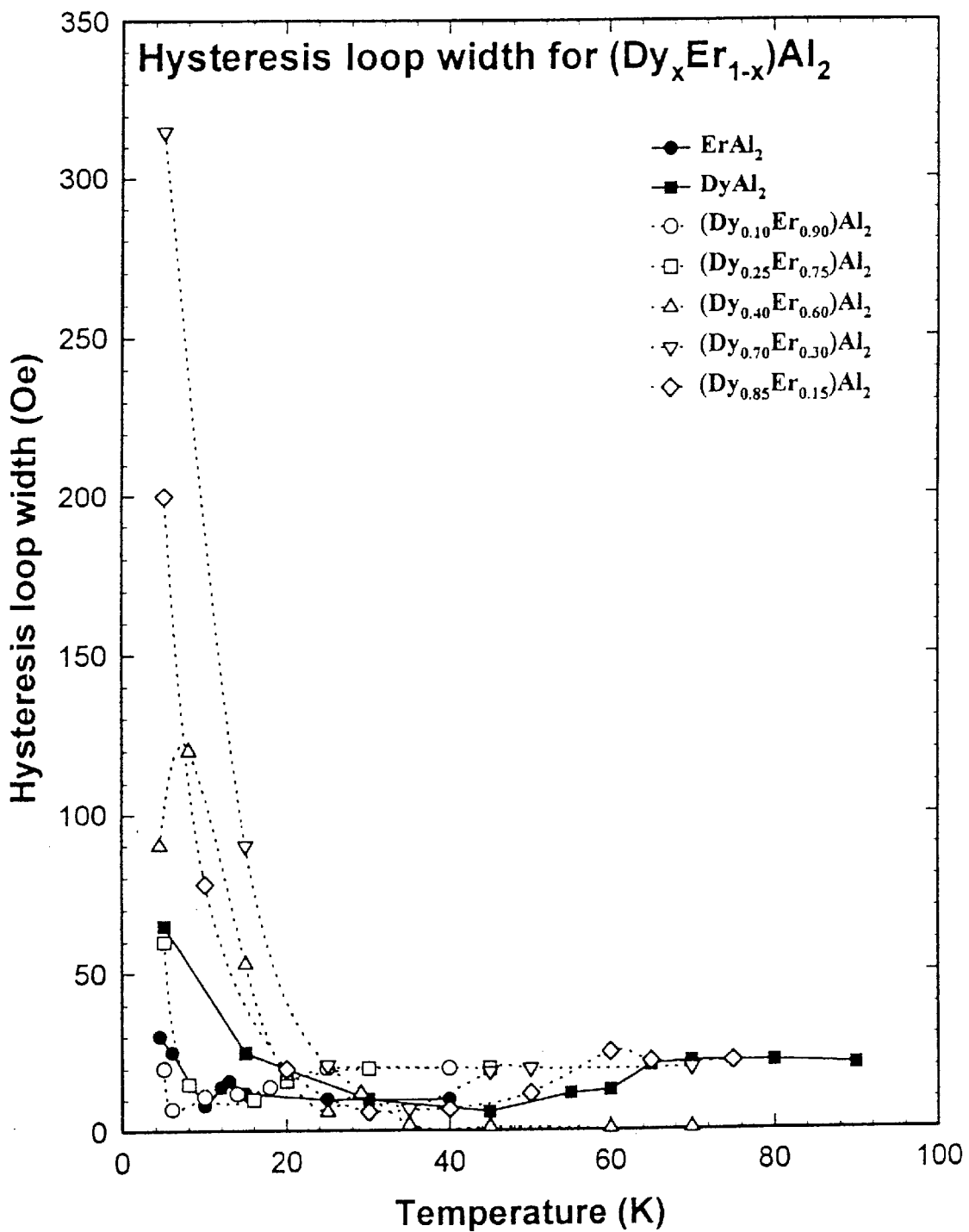
FIG. 8 is a graph of magnetic hysteresis as a function of temperature for the listed $(Dy_{1-x}Er_x)Al_2$ materials.

The B—H hysteresis loops (magnetic hysteresis as a function of temperature) were measured for the binary and ternary alloys listed in FIG. 8. Above 18 K, the maximum width of the hysteresis loop was 20 Oe (Oersted) for all alloys listed. Below 18 K, the hysteresis loops are broader, especially for the $(Dy_{1-x}Er_x)Al_2$ alloys with x=0 to 0.6., the maximum width observed being 315 Oe at 10 K for the alloy where x=0.3.

The magnetocaloric effect $\Delta T_{ad}$, i.e. adiabatic temperature change of the refrigerant material, for a magnetic field change was calculated from the entropy (S) versus temperature curves measured at the various applied magnetic fields. Temperature change versus temperature curves were calculated from the measured heat capacity data by first integrating the C/T versus T curves (where C is heat capacity in joules/mole degree K and T is temperature in Kelvin degrees), and then the adiabatic temperature change was determined from the entropy versus temperature curve as indicative of the magnetocaloric effect as described in more detail in aforementioned U.S. Pat. No. 5,435,137, the teachings of which are incorporated herein to this end.

Figure 9:
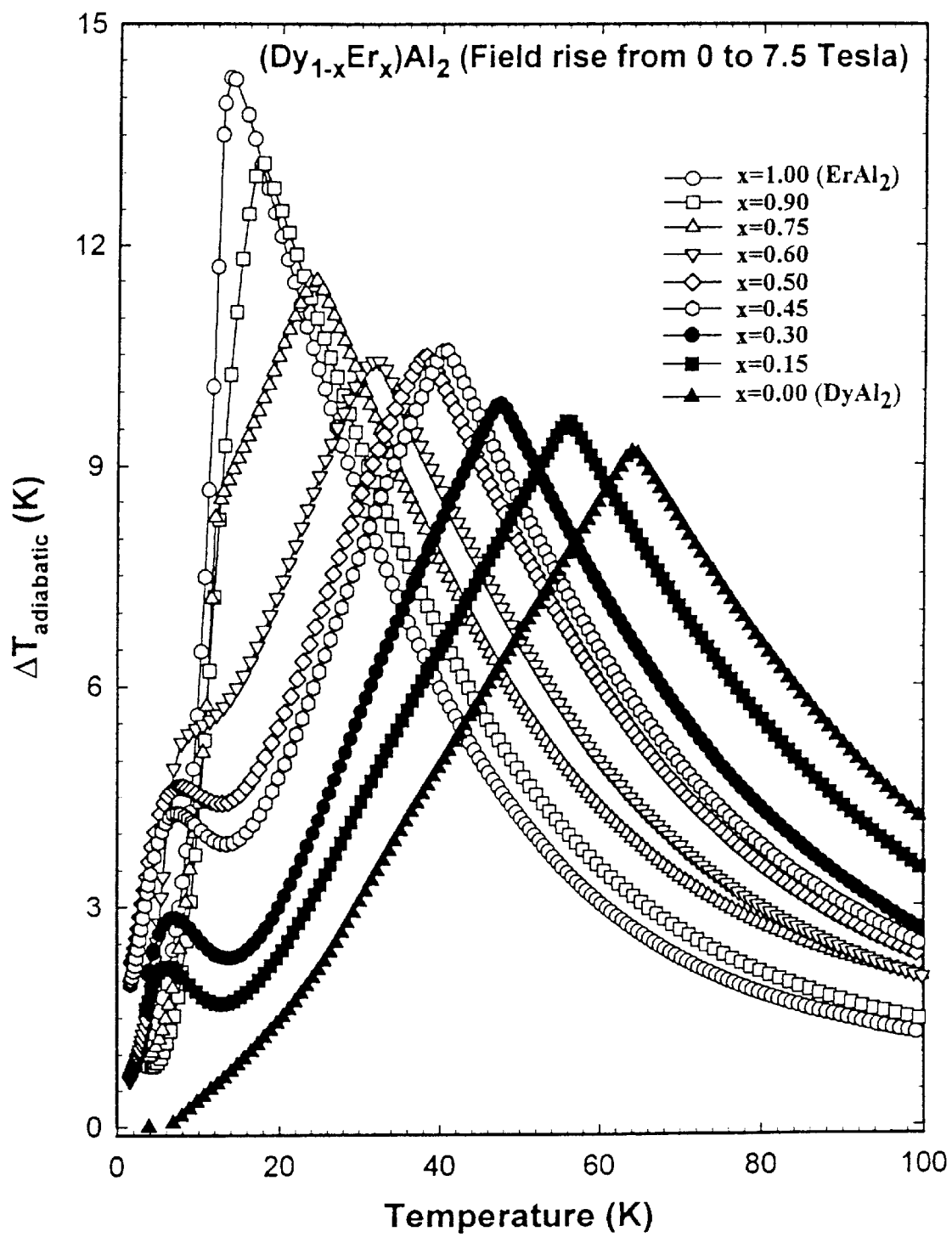
FIG. 9 is a graph of calculated adiabatic temperature change versus temperature for a magnetic field of 0 to 7.5 Tesla for the $(Dy_{1-x}Er_x)Al_2$ materials having specified x values.

The temperature dependence of $\Delta T_{ad}$ for magnetic field change from 0 to 7.5 Tesla for the $(Dy_{1-x}Er_x)Al_2$ alloys is shown in FIG. 9 and set forth in Table 2 below for $\Delta T_{ad}$ and $\Delta T_{max}$.

TABLE 2

Magnetocaloric parameters of the $(Dy_{1-x}Er_x)Al_2$ alloys for a magnetic field change from 0 to 7.5 T.

| Composition | $T_{max}$ (K.) | $\Delta T_{ad}$ at $T_{max}$ (K.) | $\sigma \Delta T_{ad}$ at $T_{max}$ (K.) | $\sigma \Delta T_{ad}$ at 100K (K.) |
|---|---|---|---|---|
| $DyAl_2$ | 63.9 | 9.18 | 0.19 | 0.28 |
| $(Dy_{0.85}Er_{0.15})Al_2$ | 55.7 | 9.59 | 0.19 | 0.30 |
| $(Dy_{0.70}Er_{0.30})Al_2$ | 47.5 | 9.83 | 0.18 | 0.30 |
| $(Dy_{0.55}Er_{0.45})Al_2$ | 40.8 | 10.54 | 0.19 | 0.34 |
| $(Dy_{0.50}Er_{0.50})Al_2$ | 38.2 | 10.46 | 0.16 | 0.31 |
| $(Dy_{0.40}Er_{0.60})Al_2$ | 31.6 | 10.40 | 0.14 | 0.29 |
| $(Dy_{0.25}Er_{0.75})Al_2$ | 24.4 | 11.00 | 0.12 | 0.29 |
| $(Dy_{0.10}Er_{0.90})Al_2$ | 17.7 | 13.10 | 0.10 | 0.27 |
| $ErAl_2$ | 13.6 | 14.26 | 0.09 | 0.30 |

The $(Dy_{1-x}Er_x)Al_2$ alloys exhibit the typical caret-like behavior or curve shape. The maximum $\Delta T_{ad}$ value was observed in pure $ErAl_2$ while the lowest value was found in pure $DyAl_2$ with a smooth, non-linear decrease with decreasing x from $ErAl_2$ to $DyAl_2$. Furthermore, the curves for high x values are asymmetrical, sharply rising on the low temperaure side, while for x less than or equal to 0.6, the $\Delta T_{ad}$ versus T curves are more or less symmetrical (ignoring the effects below approximately 10 K). This is due to the $T_c$ values being so low for x greater than or equal to 0.4 and, for the magnetic entropy to be fully utilized, the $\Delta T_{ad}$ value must rise sharply to a large value, resulting in the asymmetrical shape of the magnetocaloric effect. The peaks in the $\Delta T_{ad}$ versus T plots are the Curie temperatures, and these temperatures are listed in Table 1 along with those obtained from the ac susceptibility measurements. The low temperature bump at approximately 10 K is probably due to crystalline electric field (CEF) effects on Er, although Applicants do not intend or wish to be bound by any theory. The estimated errors (sigma $\Delta T_{ad}$) for $\Delta T_{ad}$ are listed in Table 2 for the temperatures of the maximum or peak and also at T=100 K.

In FIG. 9, the bump for the $(Dy_{1-x}Er_x)Al_2$ alloys with x less than or equal to 0.6 at approximately 8 K decreases in magnitude with decreasing x values and is no longer observed in pure $DyAl_2$, while its temperature remains essentially constant, or perhaps decreases slightly with decreasing x values. This result is attributed to movement of magnetic ordering to higher temperatures and lowering of the peak height of CEF effect as the Dy content increases.

The magnetocaloric caret-like curves of FIG. 9 are broader than those observed in most materials. The extra increase in the magnetocaloric curves below approximately 15 K is attributable to CEF effects, although Applciants do not intend or wish to be bound by any theory in this regard and may be useful for cooling below the boiling point of hydrogen gas to form hydrogen slush.

Figure 10:
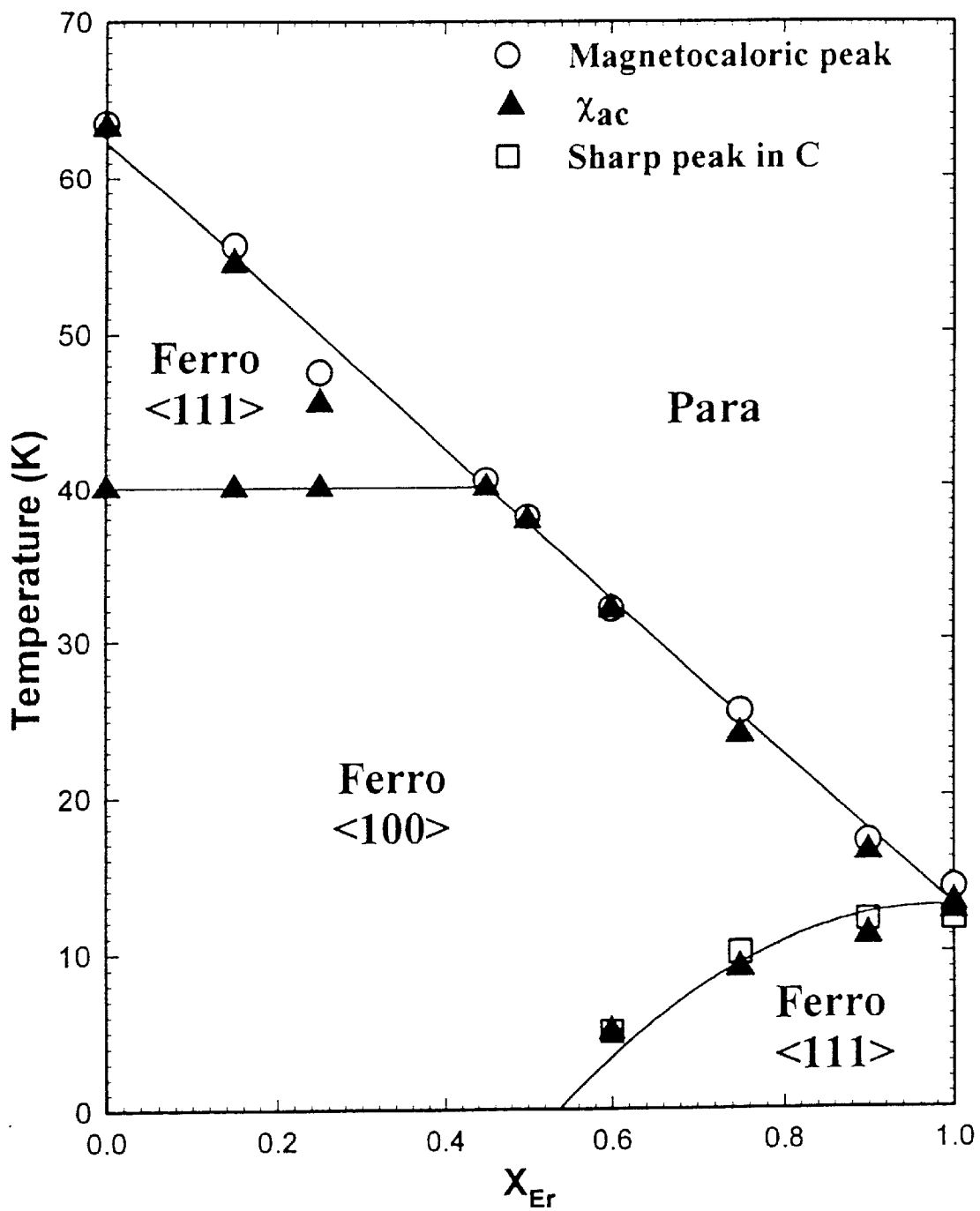
FIG. 10 is the zero magnetic field magnetic phase diagram for the $(Dy_{1-x}Er_x)Al_2$ alloys.

From the above data, a magnetic phase diagram for the $(Dy_{1-x}Er_x)Al_2$ alloys is set forth in FIG. 10. The diagram reveals the existence of a 111 magnetic "easy" axis in the $DyAl_2$-rich alloys at high temperatures.

Figure 11:
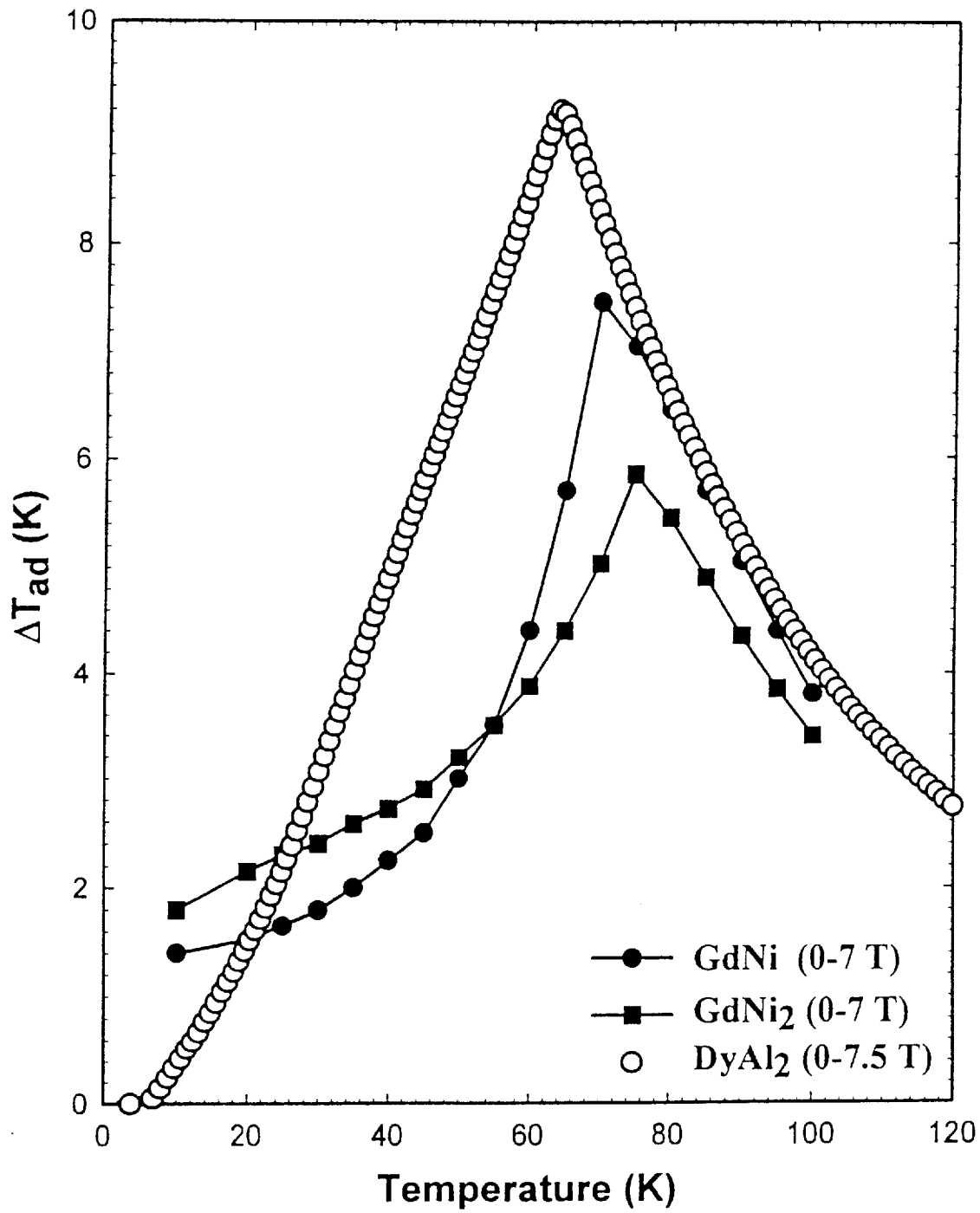
FIG. 11 sets forth graphs of calculated adiabatic temperature change versus temperature for a magnetic field change of 0 to 7–7.5 Tesla for $DyAl_2$, $GdNi$, $GdNi_2$.

Since the $T_c$ of $DyAl_2$ is slightly lower than that of $GdNi_2$ (a proposed upper stage refrigerant for a prototype magnetic refrigerator for the liquefaction of hydrogen), FIG. 11 is offered to compare the magnetocaloric effect for them. Also shown is the magnetocaloric effect for GdNi, which is a proposed alternative prototype material for the demonstration upper stage magnetic regenerator. It is apparent from FIG. 11 that $DyAl_2$ has a larger $\Delta T_{ad}$ (by as much as 100%) than $GdNi_2$ for T greater than 25 K, especially between 40 and 75 K, the critical temperature span for the upper stage.

Figure 12:
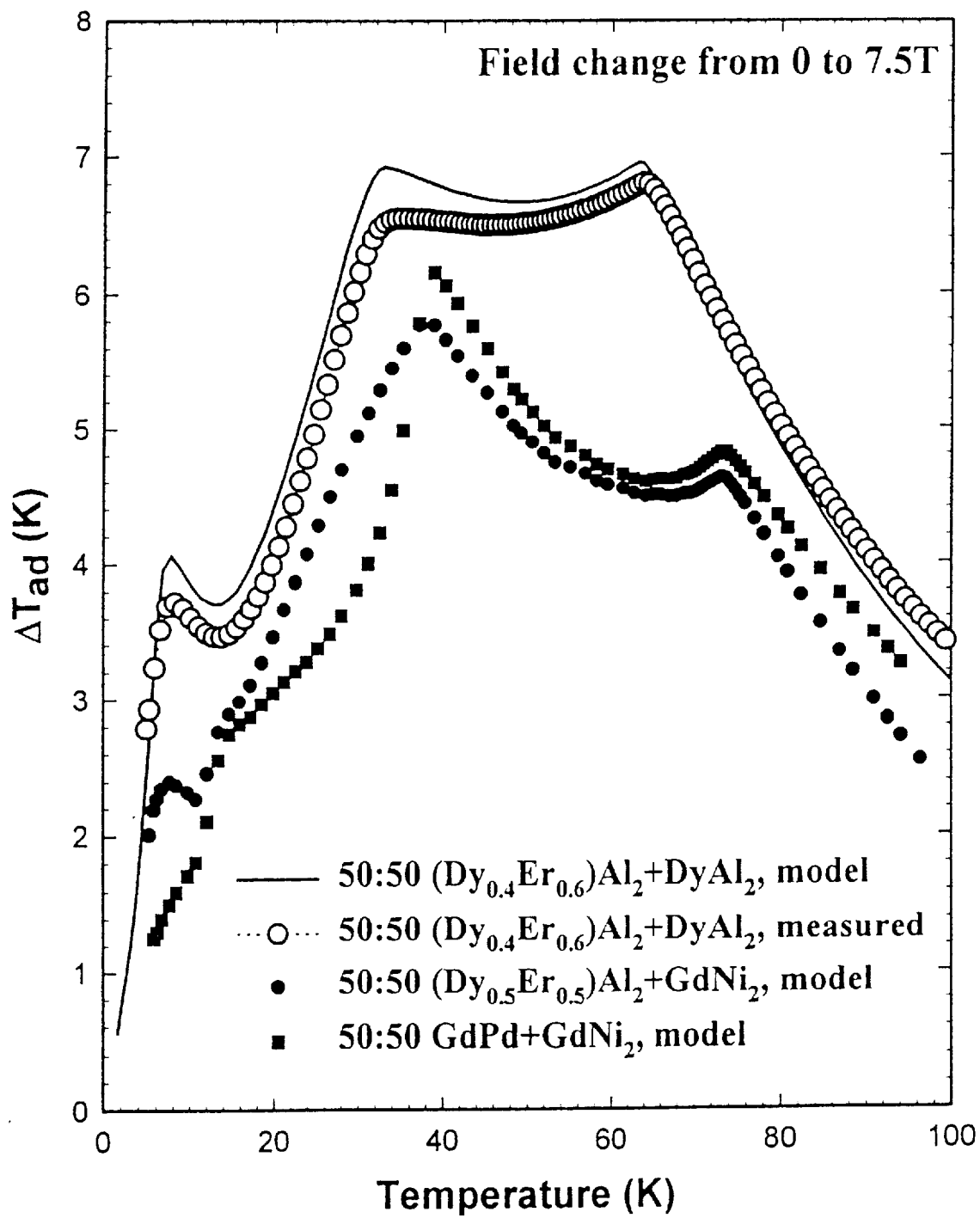
FIG. 12 is graph of adiabatic temperature rise for 50:50 two phase mixtures of $DyAl_2$ and $(Dy_{0.4}Er_{0.6})Al_2$, of $GdNi_2$ and $(Dy_{0.5}Er_{0.5})Al_2$, and $GdNi_2$ and $GdPd$.

FIG. 12 is graph of adiabatic temperature rise for 50:50 (weight %) two phase mixtures of: $DyAl_2$ and $(Dy_{0.4}Er_{0.6})Al_2$ as measured and as calculated, of $GdNi_2$ and $(Dy_{0.5}Er_{0.5})Al_2$ as calculated, and $GdNi_2$ and GdPd as calculated. The calculated curves were based on an estimate of combined magnetocaloric effects of the lower and upper stages as a linear combination of the heat capacities of the respective alloys involved. The total entropy then was calculated from the combined heat capacities, and the $\Delta T_{ad}$ values were calculated from the total entropies as designated as "model" curves in FIG. 12.

Direct measurement of the heat capacity for the 50:50 two phase mixture of $DyAl_2$ and $(Dy_{0.4}Er_{0.6})Al_2$ was conducted by crushing the two alloys to approximately 150 micron particulate size, mixing them together with Ag powder having approximately 50 micron particulate size in proportions of 20 weight % Ag, 40 weight % $(Dy_{0.4}Er_{0.6})Al_2$, and 40 weight % $DyAl_2$ and compressing the mixture at 345 MPa and ambient temperature to form a small compact for the heat capacity measurement. The heat capacity of the Ag component was substracted from the observed data to give the heat capacity of the two phase mixture comprising $DyAl_2$ and $(Dy_{0.4}Er_{0.6})Al_2$. The magnetocaloric effect was calculated as described above using the measured heat capacity data.

As is seen in FIG. 12, the calculated and measured magentocaloric effect $(\Delta T_{ad})$ are in good agreement.

Moreover, the $DyAl_2$ and $(Dy_{0.4}Er_{0.6})Al_2$ mixture exhibits much improved magnetocaloric effect, especially between 20 and 90 K (where the liquefaction of hydrogen gas would be conducted by magnetic refrigerators) as compared to the other mixtures.

Figure 13:
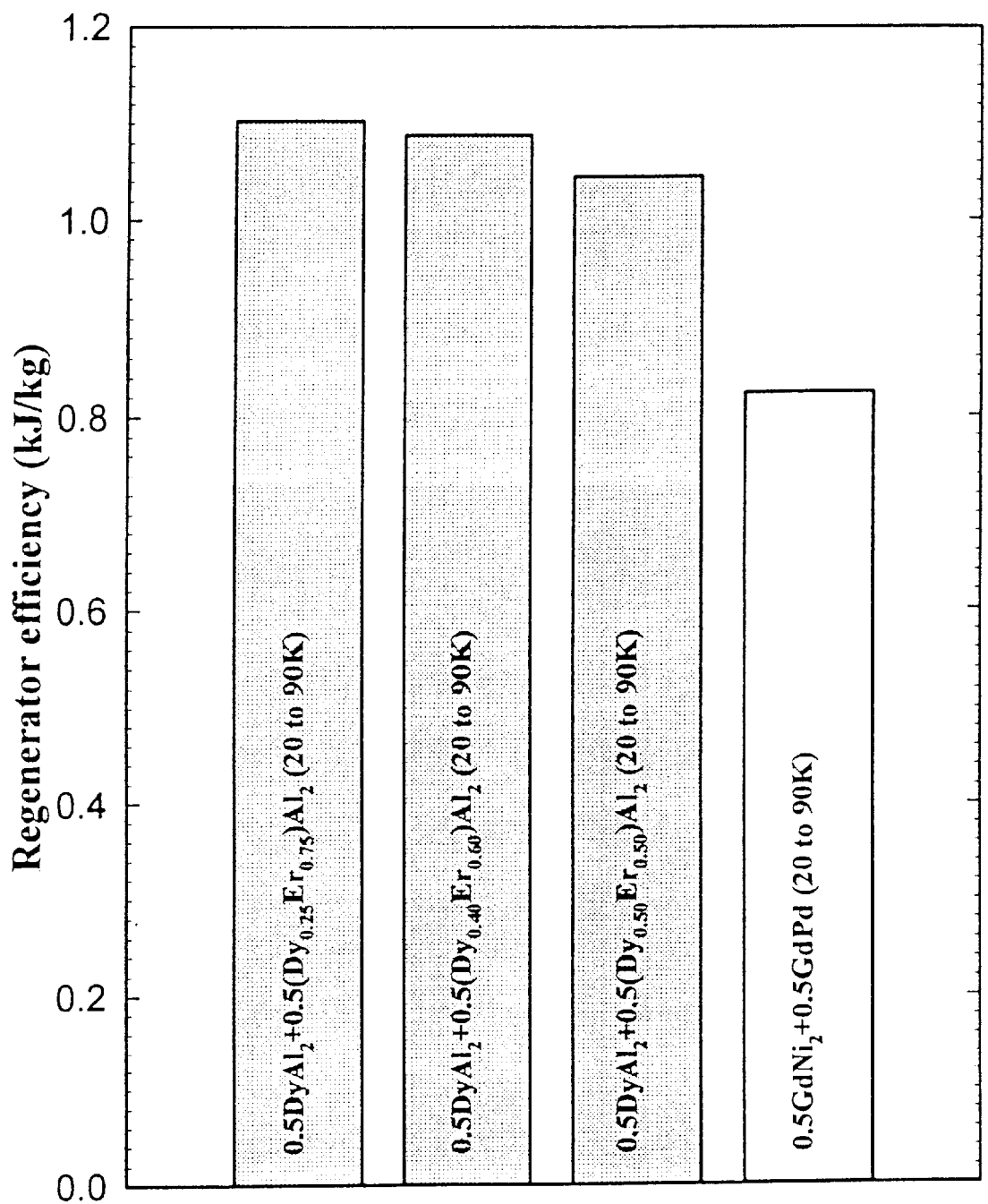
FIG. 13 is a bar graph of the regenerator efficiency parameter (figure of merit) for the respective high temperature stage refrigerant (i.e. $DyAl_2$) combined with a low temperature stage refrigerant (i.e. $(Dy_{1-x}Er_x)Al_2$ with specified x value) pursuant to the invention as well as the comparison high temperature stage and low temperature stage refrigerants (i.e. 0.5 $GdNi_2$ and 0.5 $GdPd$).

FIG. 13 is a bar graph of the regenerator efficiency parameter (figure of merit) for the high temperature stage refrigerant (i.e. $DyAl_2$) in combination with different lower temperature stage refrigerants comprising $(Dy_{1-x}Er_x)Al_2$ with x values of 0.5, 0.6, and 0.75. The regenerator efficiency of a proposed demonstration high temperature stage comprising $GdNi_2$ refrigerant and lower temperature stage comprising a GdPd refrigerant is illustrated for comparison purposes. The regenerator efficiency parameter is determined from the integration of $S_M$ as a function of temperature $T_1$ to $T_2$ (in this case from 20 to 90 K).

FIG. 13 reveals that the high temperature stage refrigerant (i.e. $DyAl_2$) in combination with different lower temperature stage refrigerants comprising respective $(Dy_{1-x}Er_x)Al_2$ with x values of 0.5, 0.6, and 0.75 exhibit significantly improved regenerator efficiencies of 28%, 32%, and 34% compared to that provided by the high temperature stage comprising $GdNi_2$ refrigerant and lower temperature stage comprising GdPd refrigerant.

The present invention provides a two stage active magnetic regenerator wherein a high temperature stage comprises $DyAl_2$ and a lower temperature stage comprises $(Dy_{1-x}Er_x)Al_2$ with x values selected to provide a desired final cooling temperature below for example 77 K (the boiling point of liquid nitrogen). The combination of particular refrigerants would be made as required to achieve a particular final temperature for a particular use or service application.

For example, for cooling hydrogen gas to form hydrogen slush at approximtely 15 K, the lower temperature stage would comprise $(Dy_{0.25}Er_{0.75})Al_2$ and the high temperature stage would comprise $DyAl_2$.

For cooling hydrogen gas to achieve liquefaction of gaseous hydrogen at approximately 20 K, the lower temperature stage would comprise $(Dy_{0.40}Er_{0.60})Al_2$ and the high temperature stage would comprise $DyAl_2$.

In practicing the invention, the particular active magnetic refrigerant for the low temperature stage is chosen within the compositions set forth such that low temperaure stage has sufficient cooling power from approximately 45 K to about 20 K to effectively and efficiently liquefy hydrogen gas.

Although the invention has been described in detail hereabove with respect to the high temperature stage using a preferred active magnetic refrigerant comprising $DyAl_2$, the invention is not so limited. For example, as mentioned hereabove, an alternative active magnetic refrigerant for the high temperature stage comprising $(Dy_{1-x}Er_x)Al_2$ where x is selected to be greater than 0 and less than about 0.3 can be used with a particular composition selected accordingly for the high temperature range involved.

It will be understood that that the above description of the invention is susceptible to various modifications, changes, and adaptations, and the same are intended to be comprehended within the scope of the appended claims.

We claim:

1. In a dual stage active magnetic refrigerator using the Joule-Brayton thermodynamic cycle wherein said refrigerator includes means for subjecting a high temperature stage refrigerant and a relatively lower temperature stage refrigerant to magnetization/demagnetization cycles to achieve refrigeration, the improvement comprising said high temperature stage refrigerant comprising $DyAl_2$ and said low temperature stage refrigerant comprising $(Dy_{1-x}Er_x)Al_2$ where x is selected to be greater than about 0.5 and less than 1.

2. The refrigerator of claim 1 wherein the low temperaure stage refrigerant comprises $(Dy_{1-x}Er_x)Al_2$ where x is selected to be about 0.6 to about 0.9.

3. In a dual stage active magnetic refrigerator using the Joule-Brayton thermodynamic cycle for liquefaction of hydrogen wherein said refrigerator includes means for subjecting a high temperature stage refrigerant and a relatively lower temperature stage refrigerant to magnetization/demagnetization cycles to achieve refrigeration, the improvement comprising said high temperature stage refrigerant comprising $DyAl_2$ and said low temperature stage refrigerant comprising $(Dy_{0.4}Er_{0.6})Al_2$.

4. In a dual stage active magnetic refrigerator using the Joule-Brayton thermodynamic cycle for providing hydrogen slush wherein said refrigerator includes means for subjecting a high temperature stage refrigerant and a relatively lower temperature stage refrigerant to magnetization/demagnetization cycles to achieve refrigeration, the improvement comprising said high temperature stage refrigerant comprising $DyAl_2$ and said low temperature stage refrigerant comprising $(Dy_{0.25}Er_{0.75})Al_2$.

5. In a method of active magnetic regenerator refrigeration using the Joule-Brayton thermodynamic cycle wherein a high temperature stage refrigerant and a relatively lower temperature stage refrigerant are subjected to magnetization/demagnetization cycles to achieve refrigeration, the improvement comprising subjecting a high temperature stage refrigerant comprising $DyAl_2$ and a low temperature stage refrigerant comprising $(Dy_{1-x}Er_x)Al_2$ where x is selected to be greater than about 0.5 and less than 1 to said magnetization/demagnetization cycles.

6. The method of claim 5 wherein the low temperaure stage refrigerant comprises $(Dy_{1-x}Er_x)Al_2$ where x is selected to be about 0.6 to about 0.9.

7. In a method of liquefying hydrogen using active magnetic regenerator refrigeration by the Joule-Brayton thermodynamic cycle wherein a high temperature stage refrigerant and a relatively lower temperature stage refrigerant are subjected to magnetization/demagnetization cycles to achieve refrigeration, the improvement comprising subjecting a high temperature stage refrigerant comprising $DyAl_2$ and a low temperature stage refrigerant comprising $(Dy_{0.4}Er_{0.6})Al_2$ to said magnetization/demagnetization cycles.

8. In a method of providing hydrogen slush using active magnetic regenerator refrigeration by the Joule-Brayton thermodynamic cycle wherein a high temperature stage refrigerant and a relatively lower temperature stage refrigerant are subjected to magnetization/demagnetization cycles to achieve refrigeration, the improvement comprising subjecting a high temperature stage refrigerant comprising $DyAl_2$ and a low temperature stage refrigerant comprising $(Dy_{0.25}Er_{0.75})Al_2$ to said magnetization/demagnetization cycles.

9. In a dual stage active magnetic refrigerator using the Joule-Brayton thermodynamic cycle wherein said refrigerator includes means for subjecting a high temperature stage refrigerant and a relatively lower temperature stage refrigerant to magnetization/demagnetization cycles to achieve refrigeration, the improvement comprising said high temperature stage refrigerant comprising $(Dy_{1-x}Er_x)Al_2$ where x is selected to be greater than 0 and less than about 0.3 and said low temperature stage refrigerant comprising $(Dy_{1-x}Er_x)Al_2$ where x is selected to be greater than about 0.5 and less than 1.

10. The refrigerator of claim 9 wherein the low temperature stage refrigerant comprises $(Dy_{1-x}Er_x)Al_2$ where x is selected to be about 0.6 to about 0.9.

11. In a dual stage active magnetic refrigerator using the Joule-Brayton thermodynamic cycle for liquefaction of hydrogen wherein said refrigerator includes means for subjecting a high temperature stare refrigerant and a relatively lower temperature stage refrigerant to magnetization/demagnetization cycles to achieve refrigeration, the improvement comprising said high temperature stage refrigerant comprising $(Dy_{1-x}Er_x)Al_2$ where x is selected to be greater than 0 and less than about 0.3 and said low temperature stage refrigerant comprising $(Dy_{0.4}Er_{0.6})Al_2$.

12. In a dual stage active magnetic refrigerator using the Joule-Brayton thermodynamic cycle for providing hydrogen slush wherein said refrigerator includes means for subjecting a high temperature stage refrigerant and a relatively lower temperature stage refrigerant to magnetization/demagnetization cycles to achieve refrigeration, the improvement comprising said high temperature stage refrigerant comprising $(Dy_{1-x}Er_x)Al_2$ where x is selected to be greater than 0 and less than about 0.3 and said low temperature stage refrigerant comprising $(Dy_{0.25}Er_{0.75})Al_2$.

13. In a method of active magnetic regenerator refrigeration using the Joule-Brayton thermodynamic cycle wherein a high temperature stage refrigerant and a relative lower temperature stage refrigerant are subjected to magnetization/demagnetization cycles to achieve refrigeration, the improvement comprising subjecting a high temperature stage refrigerant comprising $(Dy_{1-x}Er_x)Al_2$ where x is selected to be greater than 0 and less than about 0.3 and a low temperature stage refrigerant comprising $(Dy_{1-x}Er_x)Al_2$ where x is selected to be greater than about 0.5 and less than 1 to said magnetization/demagnetization cycles.

14. The method of claim 13 wherein the low temperaure stage refrigerant comprises $(Dy_{1-x}Er_x)Al_2$ where x is selected to be about 0.6 to about 0.9.

15. In a method of liquefying hydrogen using active magnetic regenerator refrigeration by the Joule-Brayton thermodynamic cycle wherein a high temperature stage refrigerant and a relatively lower temperature stage refrigerant are subjected to magnetization/demagnetization cycles to achieve refrigeration, the improvement comprising subjecting a high temperature stage refrigerant comprising $(Dy_{1-x}Er_x)Al_2$ where x is selected to be greater than 0 and less than about 0.3 and a low temperature stage refrigerant comprising $(Dy_{0.4}Er_{0.6})Al_2$ to said magnetization/demagnetization cycles.

16. In a method of providing hydrogen slush using active magnetic regenerator refrigeration by the Joule-Brayton thermodynamic cycle wherein a high temperature stage refrigerant and a relatively lower temperature stage refrigerant are subjected to magnetization/demagnetization cycles to achieve refrigeration, the improvement comprising subjecting a high temperature stage refrigerant comprising $(Dy_{1-x}Er_x)Al_2$ where x is selected to be greater than 0 and less than about 0.3 and a low temperature stage refrigerant comprising $(Dy_{0.25}Er_{0.75})Al_2$ to said magnetization/demagnetization cycles.

\* \* \* \* \*